Jan. 2, 1923.
J. M. TAYLOR.
PROCESS OF MAKING LAMINATED FIBER PRODUCTS.
ORIGINAL FILED OCT. 27, 1921.
1,441,133.
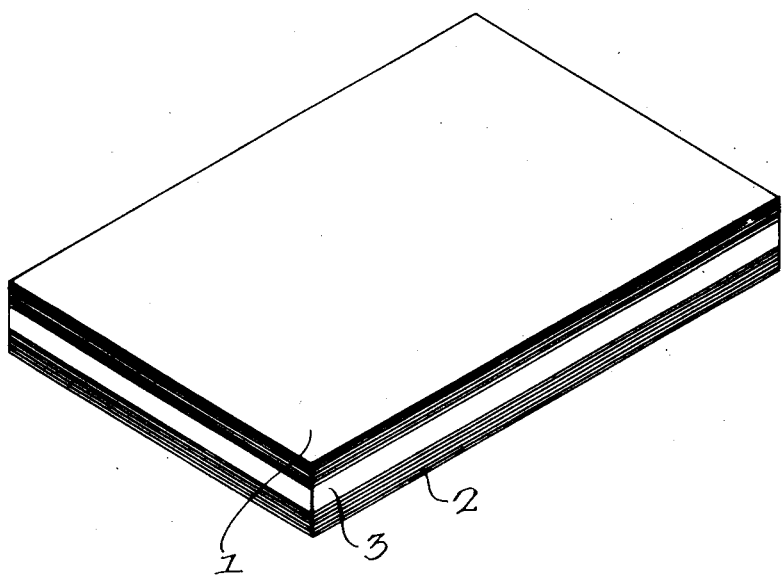
Inventor—
John M. Taylor—
by his Attorneys.
Howson + Howson Patented Jan. 2, 1923.

1,441,133

UNITED STATES PATENT OFFICE.

JOHN M. TAYLOR, OF ARDMORE, PENNSYLVANIA, ASSIGNOR TO DIAMOND STATE FIBRE COMPANY, OF ELSMERE, DELAWARE, A CORPORATION OF DELAWARE.

PROCESS OF MAKING LAMINATED FIBER PRODUCTS.

Original application filed October 27, 1921, Serial No. 510,688. Divided and this application filed December 21, 1921. Serial No. 523,886.

*To all whom it may concern:*

Be it known that I, JOHN M. TAYLOR, a citizen of the United States, residing in Ardmore, Pennslyvania, have invented the Process of Making Laminated Fiber Products (being a division of my application No. 510,688, filed October 27, 1921), of which the following is a specification.

One object of this invention is to provide a novel process for making a laminated material preferably having parchmentized fiber as its base, whereby a body of plain or untreated parchmentized fiber shall be made mechanically reinforced and rendered water proof not only on both its faces but at its edges.

A further object of the invention is to provide a novel process for making a laminated fiber product which shall possess certain valuable physical characteristics as hereafter set forth.

These objects and other advantageous ends I attain as hereinafter set forth, reference being had to the accompanying drawings, in which, The figure is a perspective view of a body of laminated material made in accordance with my invention.

In carrying out my invention I saturate or impregnate two sheets of parchmentized fiber with a phenolic condensation product, such for example as that material known on the market as condensite in its liquid or intermediate form and which is readily soluble in the ordinary solvents such as alcohol, acetone, etc.

For thus preparing these sheets of material I may treat them in accordance with the method described and claimed in the Patent to McIntosh No. 1,236,460, dated August 14, 1917, and after these sheets 1 and 2 have been dried, I apply them to the opposite faces of a plate or sheet 3 of ordinary unimpregnated parchmentized fiber. Thereafter the mass is placed between the heated platens of a suitable press whereby it is subjected to pressure such as one thousand pounds to the square inch at a temperature of one hundred and twenty-five pounds of steam. This heat and pressure are maintained for a time sufficient to cause the condensation product in the sheets 1 and 2 to pass into its final or insoluble, infusible form and at the same time said sheets are caused to so strongly adhere to the intermediate body 3 of untreated parchmentized fiber as to be integral therewith. Obviously the sheets 1 and 2 may be of any desired thickness, as may also the intermediate sheet or plate 3, and if the platens of the press in which the operation is performed are highly polished, the external surfaces of the sheets 1 and 2 are given a high finish.

Owing to the above treatment and particularly to the fact that the untreated fiber sheet 3 has its faces covered by the sheets 1 and 2 and is held thereby from expansion, said sheet 3 is effectually prevented from absorbing water. Moreover where the untreated parchmentized fiber, if immersed in water without the protective layers 1 and 2, will absorb 30% or more of its weight of water, when combined with the impervious layers or plates or sheets 1 and 2 in the same period of time it will absorb less than 1% of water, even though its edges be exposed to and in direct contact with the same. The hard water-proof layers 1 and 2 appear to so hold the intermediate layer 3 of parchmentized fiber as to prevent its expansion and thus prevent its absorbing appreciable amounts of water with which its edges are in contact.

The above described material is available for a wide variety of uses such as a raw material from which machine elements such as gears, pulleys, or the like may be formed or machined and also as an electrical insulator especially in the construction of switch boards for radio apparatus, a material for making containers or other structures which it is desirable shall be unaffected by moisture, oil or other liquids.

Obviously the finished composite plate above described may be made with less expense and in a shorter time than could a plate of the same thickness which was uniformly impregnated or saturated with the phenolic condensation product, and it is also tougher and stronger than a plate of the same dimensions made entirely of the solid phenolic condensation product.

While I preferably make the unimpregnated layer 3 of vulcanized or parchmentized fiber, I may for some purposes make this element of so called leather or fiber board which is unvulcanized and combined with the impregnated layers as above described.

It will be understood that the above described products may be built up, molded, machined, or otherwise formed into any desired shapes, since its nature is such as to lend itself with peculiar facility to these operations.

I claim:

1. The process which consists in applying to the opposite faces of a sheet of fibrous material two bodies of sheet material impregnated with a phenolic condensation product; and thereafter subjecting said sheets to heat and pressure to cause them to permanently adhere and change the condensation product therein to its final form.

2. The process which consists in applying to the opposite faces of a sheet of parchmentized fiber two bodies of sheet material impregnated with a phenolic condensation product; and thereafter subjecting said sheets to heat and pressure to cause them to permanently adhere and change the condensation product therein to its final form.

3. The process which consists in applying to a sheet of parchmentized fiber two other sheets of parchmentized fiber containing a phenolic condensation product in its intermediate stage; and thereafter subjecting said sheets to treatment to render the second and third sheets water proof.

4. The process which consists in applying to the opposite faces of a sheet of parchmentized fiber two sheets of fibrous material containing a phenolic condensation product in its intermediate stage; and subjecting said sheets to a treatment including the application of pressure to consolidate them into a single sheet and to cause the condensation product to assume its final insoluble form.

JOHN M. TAYLOR.